US 6,560,622 B2

(12) United States Patent
Katano

(10) Patent No.: US 6,560,622 B2
(45) Date of Patent: May 6, 2003

(54) BIT SEARCH DEVICE AND BIT SEARCH METHOD

(75) Inventor: Yoshito Katano, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/318,616

(22) Filed: May 26, 1999

(65) Prior Publication Data

US 2002/0194233 A1 Dec. 19, 2002

(30) Foreign Application Priority Data

Oct. 30, 1998 (JP) .......................................... 10-309781

(51) Int. Cl.[7] ................................................. G06F 7/00
(52) U.S. Cl. ...................................................... 708/211
(58) Field of Search ................................ 708/200, 211, 708/210

(56) References Cited

U.S. PATENT DOCUMENTS

| 4,348,741 | A | | 9/1982 | McAlister et al. |
| 4,924,421 | A | * | 5/1990 | Seguchi |
| 5,349,681 | A | | 9/1994 | Yoshida et al. |
| 5,570,306 | A | * | 10/1996 | Soo ........................... 708/210 |
| 5,831,877 | A | * | 11/1998 | Thomson |
| 6,195,673 | B1 | * | 2/2001 | Park |

FOREIGN PATENT DOCUMENTS

| JP | 4-109336 | 4/1992 |
| JP | 4-260926 | 9/1992 |
| JP | A-8-212055 | 8/1996 |

OTHER PUBLICATIONS

Copy of German Office Action dated Jul. 9, 2002, together with English translation.

* cited by examiner

Primary Examiner—Tan V. Mai
(74) Attorney, Agent, or Firm—Armstrong, Westerman & Hattori, LLP

(57) ABSTRACT

When one clock signal (CLK) is output, the following operations are performed: an input data signal D is latched by a data latch; a detection-type signal K is latched by a signal latch; the input data signal D is input to a 1 detecting circuit and a 0 detecting circuit, which are connected in parallel, while the data latch holds the input data signal D; for example, a 1 detection process for detecting that bit data changes from 0 to 1 or a 0 detection process for detecting that bit data changes from 1 to 0 is performed; and either a 1 detection or a 0 detection output operation, which is selected by a selector circuit 27, is performed. As a result, a bit search process is quickly performed.

9 Claims, 17 Drawing Sheets

| bit 1 | bit 0 | |
|---|---|---|
| 0 | 0 | : 0 DETECTION |
| 0 | 1 | : 1 DETECTION |
| 1 | X | : 1 CHANGE POINT DETECTION |

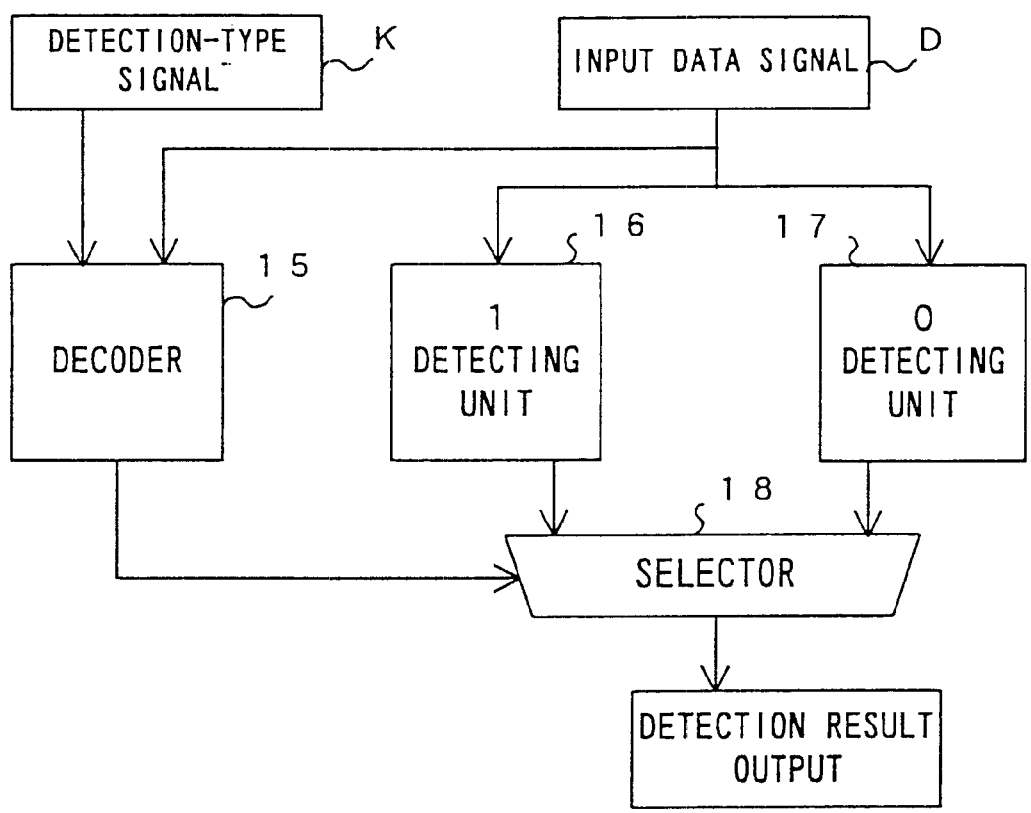
F I G. 5

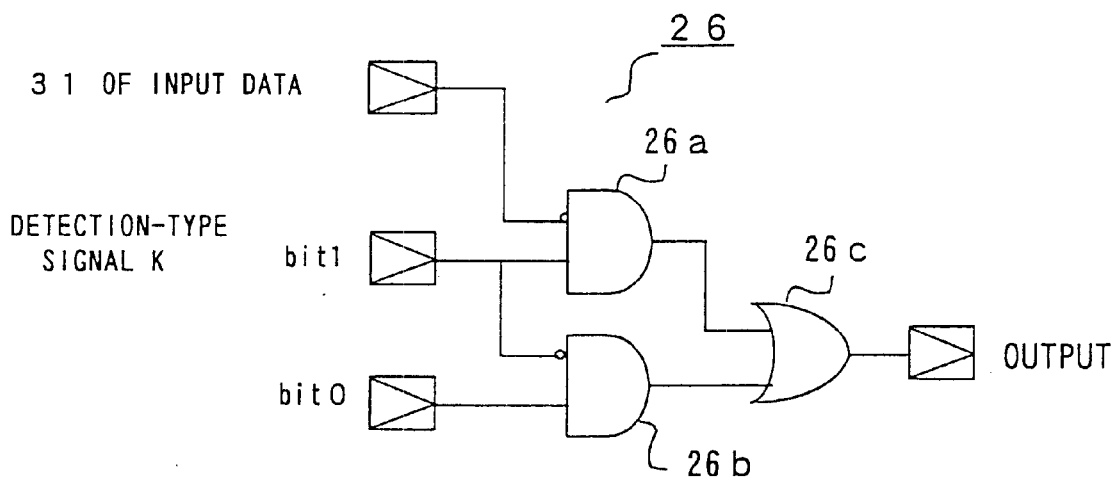
F I G. 7

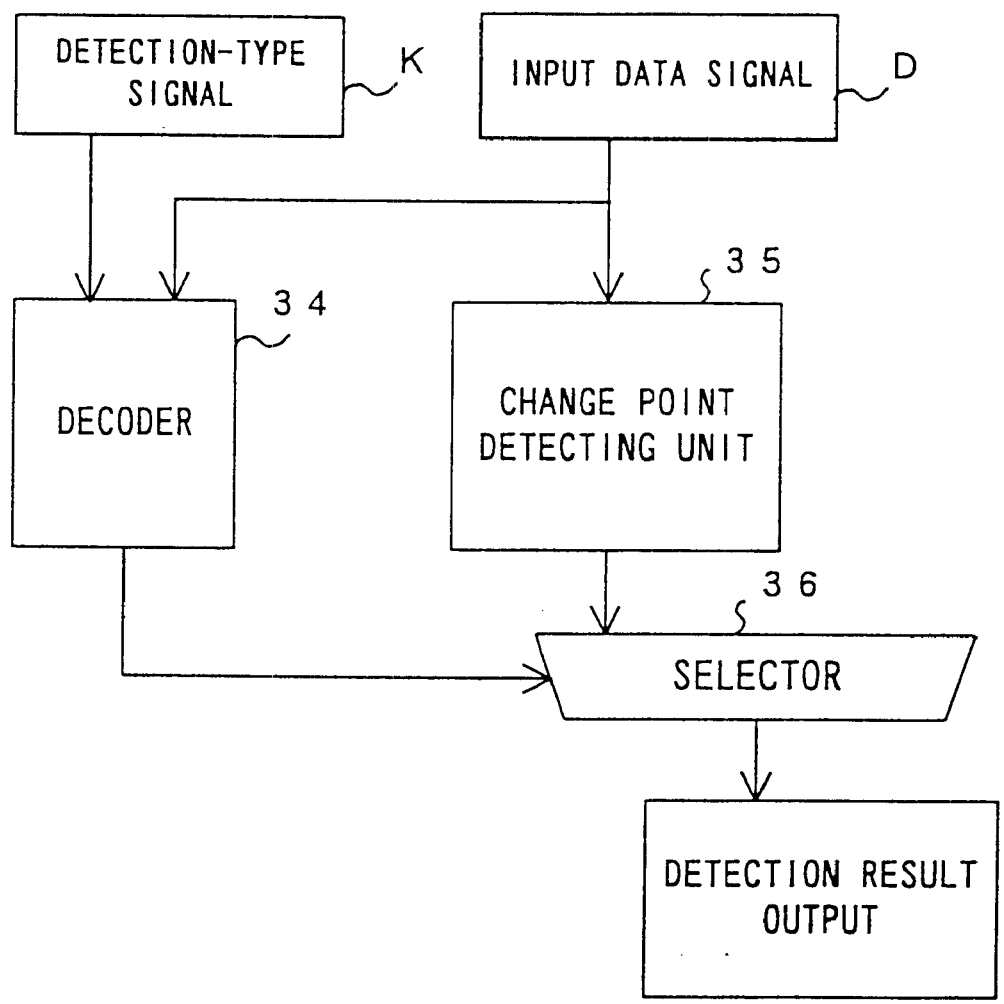
F I G. 1 2

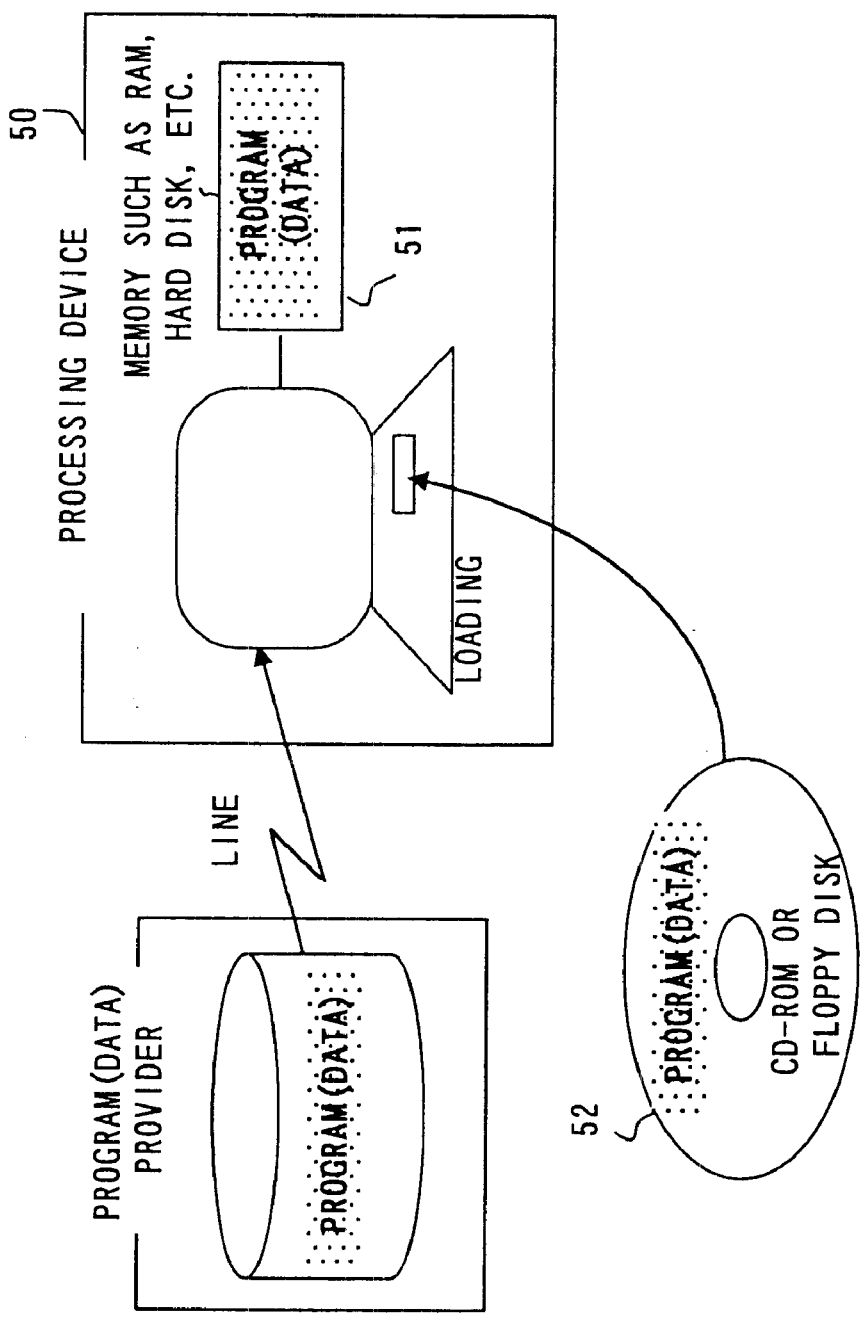
F I G. 17

BIT SEARCH DEVICE AND BIT SEARCH METHOD

BACKGROUND OF THE INVENTION

1. Field of the Invention

The present invention relates to a device and a method for searching for a bit of a signal in a semiconductor integrated circuit.

2. Description of the Related Art

Semiconductor integrated circuits have become smaller and faster, and the demand for circuits of a smaller size which quickly handle data having a longer bit length, has been increasing. It is therefore necessary to also reduce the size of a bit search circuit, and to perform a high-speed bit search.

Conventional techniques employing a bit search circuit are disclosed by U.S. Pat. Nos. 4,348,741 and 5,349,681, and Japanese Patent Application (TOKUGANHEI) Nos. 2-231966 and 3-5651.

Conventionally, the bit search method shown in FIG. 1 was used. That is, data to be bit-searched, such as 0 or 1, is provided to an inverting unit 2 and a selector 3 as an input data signal 1. The input data signal inverted by the inverting unit 2 is provided to the selector 3. Accordingly, the inverted input data signal 1' and the original input data signal 1 are provided to the selector 3.

At the same time, a detection type signal 4 is provided to a decoder 5, decoded by the decoder 5 together with the most significant bit of the above described input data signal 1, and transmitted to the selector 3.

The selector 3 selects either of the input data signals 1 and 1' according to the information provided by the decoder 5, and outputs the selected input data signal 1 or 1' to a 1 detecting unit 6. The 1 detecting unit 6 detects, for example, the bit position at which data changes from 0 to 1 within a data string included in the provided input data signal 1, and outputs the result of the detection.

FIG. 2 is a circuit diagram showing the above described bit search method. In this figure, the input data signal 1 provides a data latch 8 with data of 32 parallel bits that is synchronized with a clock signal (CLK). Additionally, the detection type signal 4 provides a signal latch 9 with a 2-bit signal that is synchronized with the same clock signal (CLK). FIG. 3 is a timing chart showing the process implemented with the conventional technique. In synchronization with the initial clock signal (CLK shown as (1) in FIG. 3), the above described input data signal 1 (D1), is latched by the data latch 8, while the detection type signal 4 (K1) is latched by the signal latch 9.

The 32-bit data latched by the data latch 8 is provided to an inverting circuit 10 corresponding to the above described inverting unit 2 and a selector circuit 13 corresponding to the selector 3, while being held by the data latch 8. The data of the most significant bit 31 of the input data signal 1 is provided to a decoder circuit 11. Also the above described detection type signal 4 latched by the signal latch 9 is provided to the decoder circuit 11, which generates a selection signal.

This decoder circuit 11 has a configuration as shown in FIG. 4A. It is composed of AND gates 11a and 11b, and an OR gate 11c. Signals are generated according to the truth values shown in FIG. 4B. By way of example, for 1 detection, the detection type signal 4 is a signal of 0, 1, and a selection signal 1 is output. For 0 detection, the detection type signal 4 is a signal of 0, 0, and a selection signal 0 is output.

In this state, for example, when the next input data signal 1 (D2) and the detection type signal 4 (K2) are provided and are synchronized with the next clock signal (CLK shown as (2) in FIG. 3), the selector circuit 13 outputs non-inverted data or inverted data to a 1 detecting circuit 12 according to the above described selection signals. If the selector circuit 13 selects non-inverted data, the 1 detecting circuit 12 detects the bit position of 1 included in the non-inverted data, and outputs a detection result R1 at the timing of the next clock signal (CLK shown as (3) in FIG. 3). If the selector circuit 13 selects inverted data, the 1 detecting circuit detects the bit position of 0 included in the inverted data, and outputs the detection result R1 at the timing of the next clock signal (CLK shown as (3) in FIG. 3).

The above described conventional method requires many clock signals (3 clock signals (CLKs 1 (1) through (3)) in the above described example), and requires a lot of time to perform a bit search. Furthermore, a bit search circuit itself becomes large, which is counter to the goal of reducing a circuit size.

SUMMARY OF THE INVENTION

An object of the present invention is to provide a bit search circuit and a bit search method, which allow a circuit size to be reduced and a bit search to be performed in a short time period.

According to the present invention, the above described object can be achieved by providing a bit search device which comprises: a selection signal generating unit for generating a selection signal; a 1 detecting unit for detecting the bit position at which data changes from 0 to 1 within an input data string in the direction from the most significant bit to the least significant bit, or from the least significant bit to the most significant bit; a 0 detecting unit for detecting the bit position at which data changes from 1 to 0 within an input data string in the direction from the most significant bit to the least significant bit or from the least significant bit to the most significant bit; and a selecting unit for selecting either of the outputs of the 1 detecting unit and the 0 detecting unit according to the selection signal output from the selection signal generating unit, and for using the selected output as a bit search output.

The selection signal generating unit generates a selection signal. Additionally, the selection signal generating unit may generate a selection signal from a detection type signal and data at a predetermined bit or bits of an input data string. The 1 detecting unit detects the bit position at which data changes from 0 to 1, for example, within 32-bit input data and in the direction from the most significant bit to the least significant bit or from the least significant bit to the most significant bit. The 0 detecting unit detects the bit position at which data changes from 1 to 0, for example, within input data of 32 bits and in the direction from the most significant bit to the least significant bit or from the least significant bit to the most significant bit. The selecting unit selects either of the data output from the 1 detecting unit and the 0 detecting unit, and uses the selected data as an output of the bit search circuit according to the present invention.

With the above described configuration, it becomes possible to generate a selection signal and to drive the 1 and 0 detection unit, for example, when one clock signal is output, and to obtain the output of a bit search circuit when the next clock signal is output. As a result, a high-speed bit search device can be created.

Additionally, according to the present invention, the above described object can be achieved by providing a bit search device which comprises: a selection signal generating unit for generating a selection signal; a change point detecting unit for detecting the bit position at which data changes within an input data string and in the direction from the most significant bit to the least significant bit or from the least significant bit to the most significant bit; and a selecting unit for selecting any of the data of bit change points, which are output from the change point detecting unit, according to the selection signal output from the selection signal generating unit, and for outputting the selected data.

Here, the change point detecting unit detects the point (position) at which data, for example, of a 32-bit data string, changes from 0 to 1 or from 1 to 0, and outputs the detected information to the selecting unit. Additionally, the selecting unit performs an output operation based on the information output from the change point detecting unit, as the bit search device according to this preferred embodiment.

With the above described configuration, a selection signal is generated and a change point (position) is detected, for example, with 1 clock signal, so that the data of the change point at which data changes can be searched quickly and the number of circuits can be reduced by using the change point detecting unit. Thus, a device size can be reduced.

BRIEF DESCRIPTION OF THE DRAWINGS

FIG. 5 is a block diagram showing the process performed by a bit search circuit according to a first preferred embodiment;

FIG. 7 is a circuit diagram showing a decoder circuit used for the bit search circuit according to the first preferred embodiment;

FIG. 12 is a block diagram showing a bit search method according to a second preferred embodiment;

FIG. 17 is a schematic diagram showing the configuration where the bit search method according to the first or second preferred embodiment is implemented by using storage media.

DESCRIPTION OF THE PREFERRED EMBODIMENTS

Figure 1:
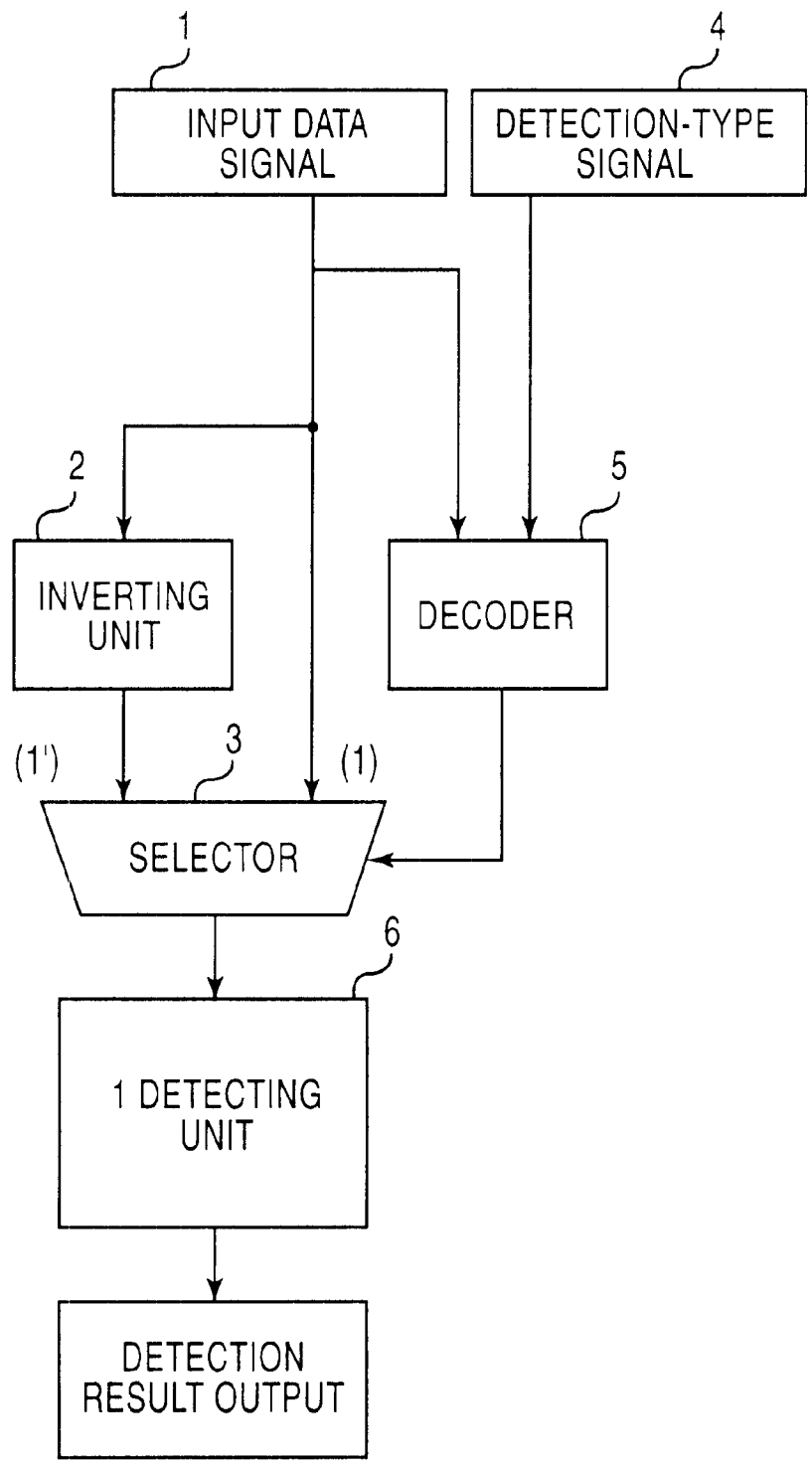
FIG. 1 is a block diagram showing a bit search method according to a conventional technique.
Figure 2:
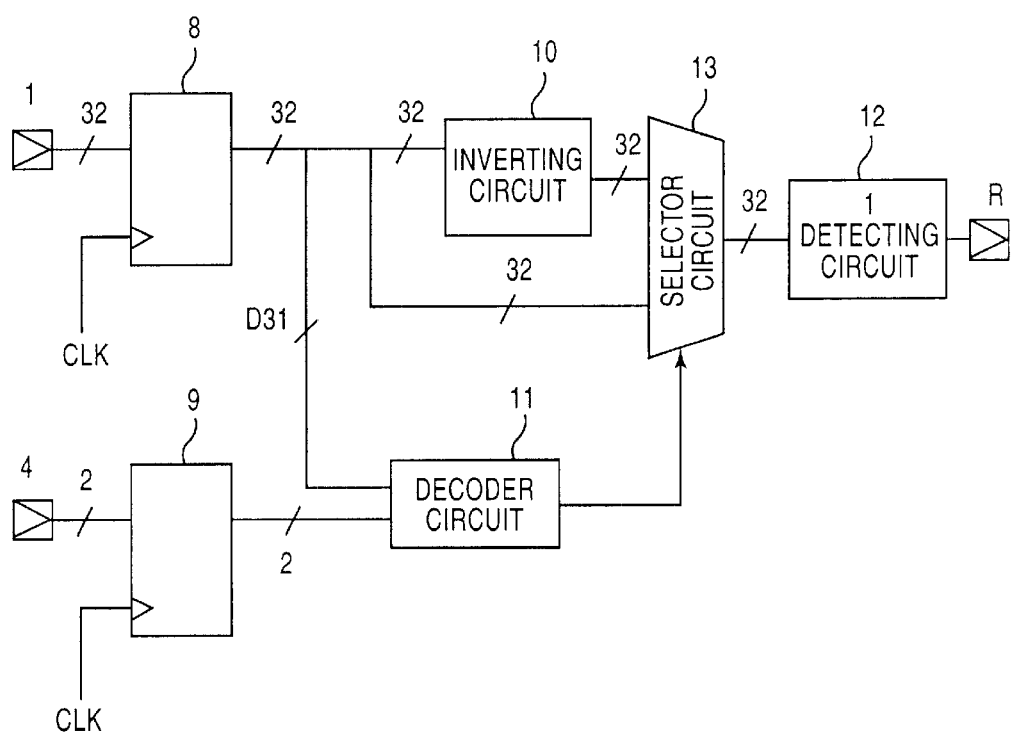
FIG. 2 is a circuit diagram showing a bit search circuit according to the conventional technique.

Provided below is a detailed explanation of the preferred embodiments. The explanation refers to the figures.

First Preferred Embodiment

FIG. 5 is a block diagram showing the process performed by a bit search device according to a first preferred embodiment.

In this figure, the bit search device is comprised of a decoder 15, a 1 detecting unit 16, a 0 detecting unit 17, and a selector 18. A detection result is output from the selector 18. Additionally, an input data signal D is 32-bit data such as data including the positional information of a decimal point. The 32-bit input data signal D is output to the 1 detecting unit 16 and the 0 detecting unit 17, and only the data of the most significant bit 31 is output to the decoder 15.

The 1 detecting unit 16 detects the bit position of data 1 included in the provided input data signal D, and outputs the detected position to the selector 18. The decoder 15 generates a selection signal based on the detection-type signal K and the data of the most significant bit 31, and outputs the generated signal to the selector 18.

The selector 18 selects either the bit position detection data of 1, which is output from the 1 detecting unit 16, or the bit position detection data of 0, which is output from the 0 detecting unit 17, according to the selection signal provided by the decoder 15, and uses the selected data as a detection result output.

Note that the bit position detection of 1 is the same as the detection of the bit position at which data changes from 0 to 1 if the input data signal D is a positive value, while the bit position detection of 0 is the same as the detection of the bit position at which data changes from 1 to 0 if the input data signal D is a negative value.

Figure 6:
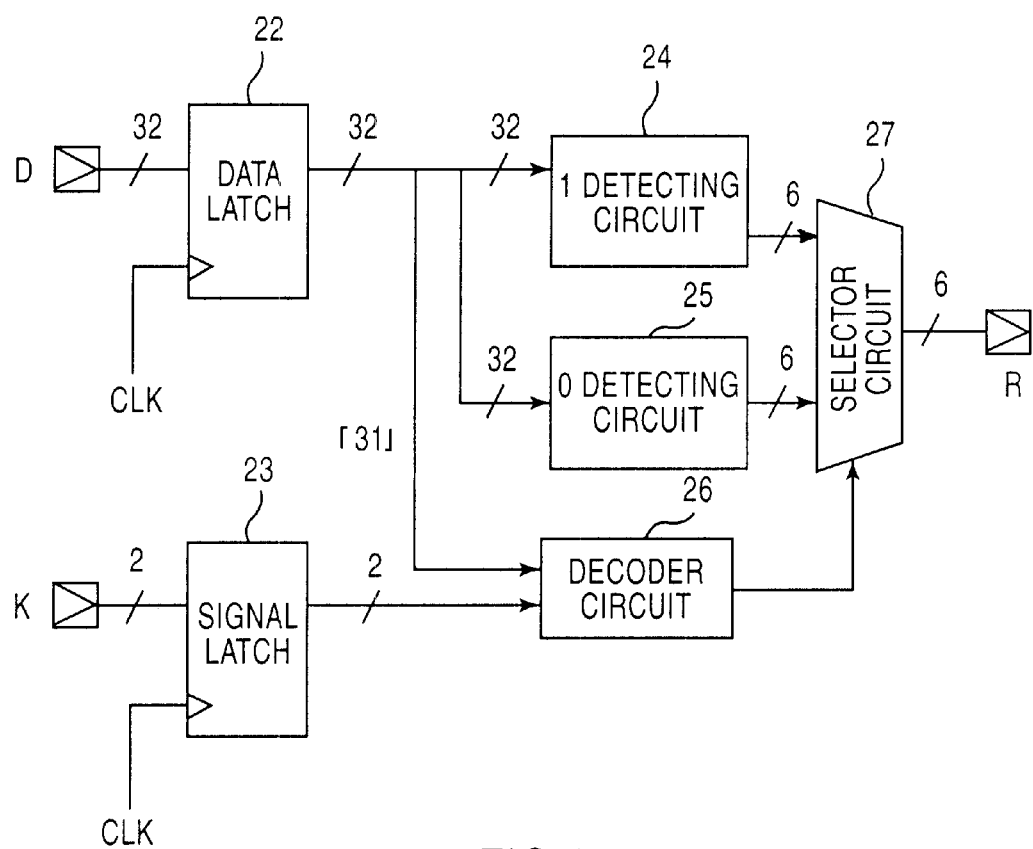
FIG. 6 is a circuit diagram showing the bit search circuit according to the first preferred embodiment.

The circuit diagram of a specific example of the bit search circuit described above is illustrated in FIG. 6.

In this figure, the bit search circuit is comprised of a data latch 22, a signal latch 23, and a 1 detecting circuit 24, a 0 detecting circuit 25, a decoder circuit 26, and a selector circuit 27, which correspond to the components shown in FIG. 5. Note that the values 2, 6, and 32 shown in this figure indicate the number of bits of data or a signal, which are transmitted in parallel.

Provided next is an explanation about the specific configurations of the respective circuits. The explanation refers to FIGS. 7 through 10. FIG. 7 shows the specific configuration of the above described decoder circuit 26. The decoder circuit 26 is comprised of AND gates 26a and 26b, and an OR gate 26c. The above described data of the most significant bit 31 is inverted and input to the AND gate 26a. Furthermore, one of the two bits (bit 1) of the detection-type signal K is input to the AND gate 26a, and its inverted signal is input to the AND gate 26b. The other of the two bits (bit 0) of the detection-type signal K is input to the AND gate 26b.

The AND gate 26a outputs 1 (high signal) or 0 (low signal) to the OR gate 26c according to both of the provided signals. Also, the AND gate 26b outputs 1 (high signal) or 0 (low signal) to the OR gate 26c according to both of the provided signals. When 1 (high signal) is provided from one of the AND gates 26a and 26b, the OR gate 26c outputs 1 (high signal) to the selector circuit 27.

Figure 8:
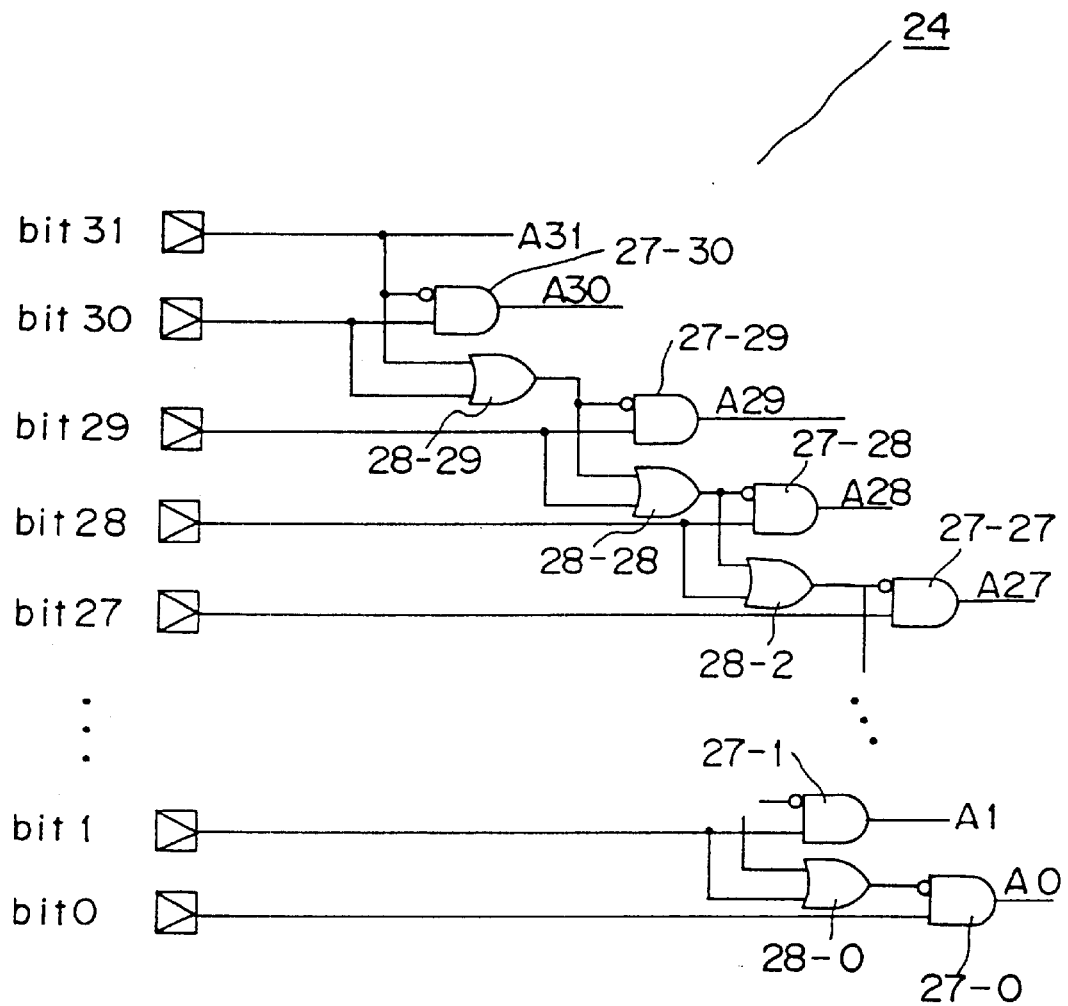
FIG. 8 is a circuit diagram showing a 1 detecting circuit used for the bit search circuit according to the first preferred embodiment.
Figure 9:
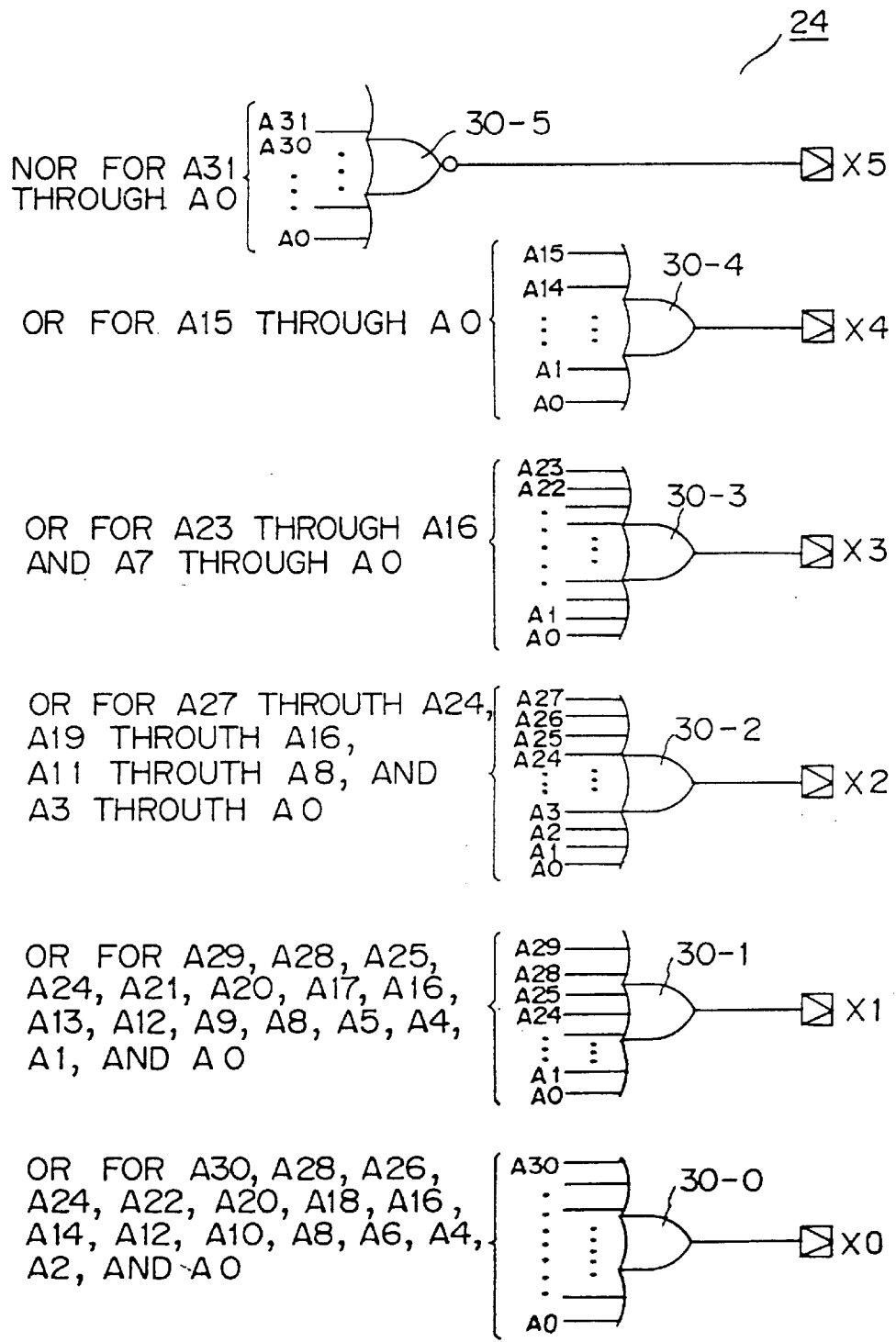
FIG. 9 is a circuit diagram showing the 1 detecting circuit used for the bit search circuit according to the first preferred embodiment.

FIG. 8 and FIG. 9, which will be described later, are circuit diagrams showing the specific configurations of the above described 1 detecting circuit 24, which detects the bit position of 1 included 32-bit data. Refer to FIG. 8. The circuit shown in this figure is comprised of 31 AND gates 27-30 through 27-0 and 30 OR gates 28-29 through 28-0. Corresponding bit data are input to the respective AND gates 27-30 through 27-0, and the position at which the data 1 exists is detected.

For example, the data of the most significant bit 31 is inverted and input to the AND gate 27-30, and is input to the OR gate 28-29. The data of the next bit 30 is input to the AND gate 27-30 and to the OR gate 28-29. Accordingly, the data output from the AND gate 27-30 is, for example, the data 0 of the most significant bit 31. If the data of the next bit 30 is 1, data 1 (high signal) is output. If the data of the most significant bit 31 is 1, 1 is input to the circuit, which is shown in FIG. 9 and will be described later, as an output (A31).

Additionally, the data of the next bit 29 is input to the AND gate 27-29 and to the OR gate 28-28. Furthermore, the inverted data of the data output from the OR gate 28-29 is input to the AND gate 27-29, which performs an output operation according to both sets of the provided data. Here, suppose that the data of the most significant bit 31 is 0, the data of the next bit 30 is 0, and the data of the next bit 29 is 1. In this case, the AND gate 27-29 outputs the data 1 (high signal).

Similarly, each of the AND gates 27-28 through 27-0 performs an output operation according to provided data. For example, the AND gate 27-28 outputs 1 (high signal) only if the corresponding bit 28 is data 1, and the AND gate 27-27 outputs 1 (high signal) only if the corresponding bit 27 is data 1. Thereafter, the circuit is driven in a similar manner. Specifically, the AND gate 27-1 outputs 1 (high signal) only if the corresponding bit 1 is 1, and also the AND gate 27-0 outputs 1 (high signal) only if the corresponding bit 0 is 1.

Here, assume that the outputs of the AND gates 27-0, 27-1, 27-2, ..., 27-29, and 27-30 are, respectively, A0, A1, A2, ..., A29, and A30, and the output of the most significant bit 31 is A31. In this case, the outputs A0 through A31 are provided to OR gates 30-4 through 30-0 and to a NOR gate 30-5, which are shown in FIG. 9.

For example, if the outputs A30, A28, A26, A24, A22, ..., A2, and A0 are input to the OR gate 30-0 and if any one of these inputs is 1, 1 (high signal) is output from the OR gate 30-0. The output of the OR gate 30-0 is defined to be an output X0.

Similarly, the outputs A29, A28, A25, A24, ..., A1, and A0 are input to the OR gate 30-1, and if any one of the inputs is 1, 1 (high signal) is output from the OR gate 30-1. The output of the OR gate 30-1 is defined to be an output X1. Thereafter and in a similar manner, the outputs A27 through A24, A19 through A16, ..., and A3 through A0 are input to the OR gate 30-2, the outputs A23 through A16 and A7 through A0 are input to the OR gate 30-3, and the outputs A15 through A0 are input to the OR gate 30-4. The outputs A31 through A0 are input to the NOR gate 30-5. If any one of the inputs is 1 in a gate, 1 (high signal) is output from a corresponding OR gate.

As shown in FIG. 9, an output X2 is the output of the OR gate 30-2, an output X3 is the output of the OR gate 30-3, an output X4 is the output of the OR gate 30-4, and an output X5 is the output of the NOR gate 30-5.

Figure 10:
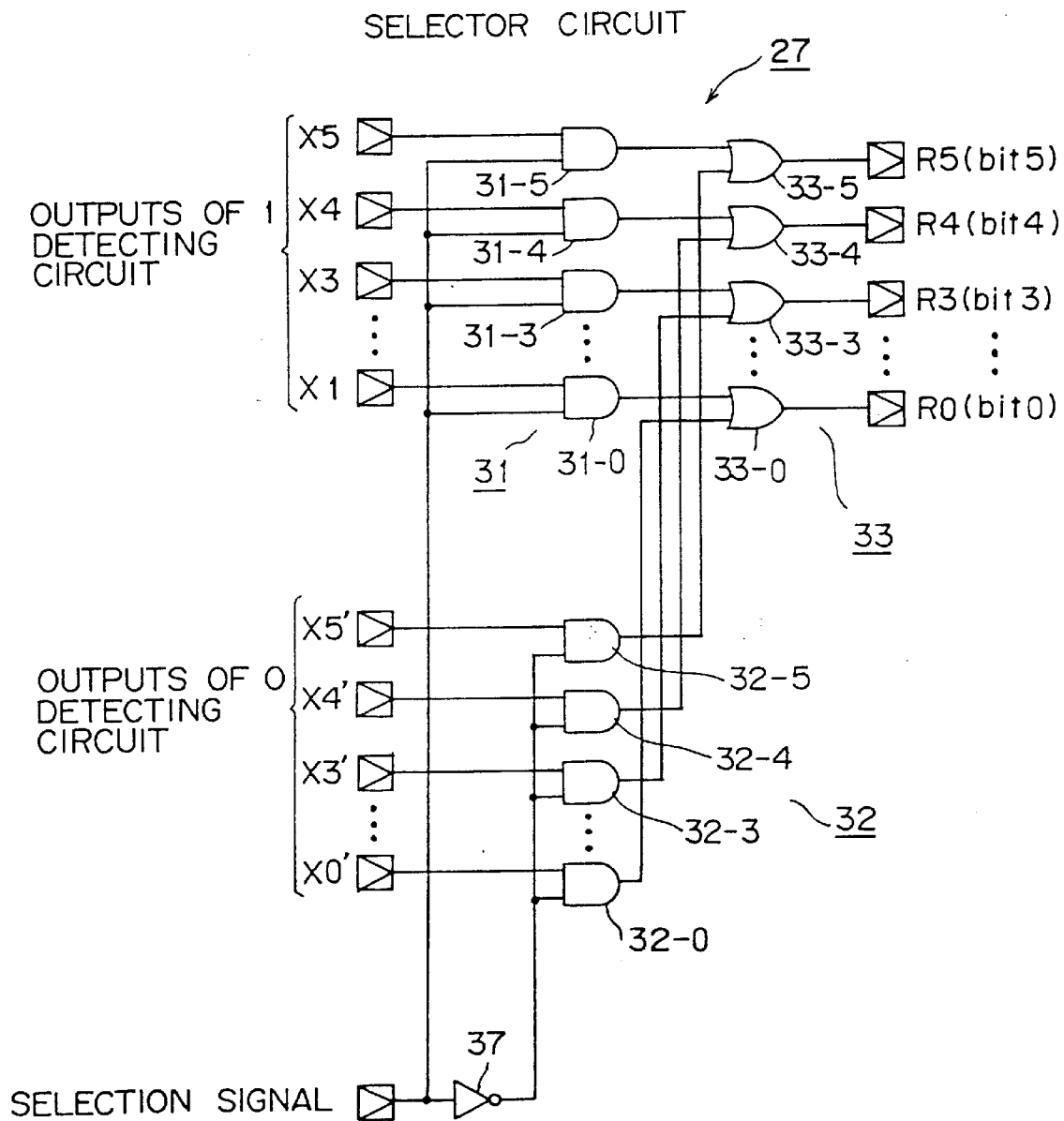
FIG. 10 is a circuit diagram showing a selector circuit used for the bit search circuit according to the first preferred embodiment.

FIG. 10 is a circuit diagram showing the specific configuration of the selector circuit 27. The selector circuit 27 is composed of an AND gate 31 to which the outputs X0 through X5 of the 1 detecting circuit 24 are input, an AND gate 32 to which the output of the 0 detecting circuit 25 is input, and an OR gate 33. The AND gate 31 is comprised of six AND gates 31-5 through 31-0 which correspond to the outputs X5 through X0. Also the AND gate 32 is comprised of six AND gates 32-5 through 32-0 which correspond to the outputs (X5' through X0') of the 0 detecting circuit 25.

Furthermore, the selection signal output from the above described decoder circuit 26 is also input to the selector circuit 27 shown in FIG. 10. For instance, the selection signal is input to the AND gates 31-5 through 31-0 unchanged, while it is input to the AND gates 32-5 through 32-0 via an inverter 37. Accordingly, if the selection signal is 1, the outputs of the AND gates 31-5 through 31-0 are input to the OR gates 33-5 through 33-0 in order to select the outputs X5 through X0, which are the outputs of the 1 detecting circuit 24. If the selection signal is 0, the outputs of the AND gates 32-5 through 32-0 are input to the OR gates 33-5 through 33-0 in order to select the outputs X5' through X0', which are the outputs of the 0 detecting circuit 25.

The outputs of the AND gates 31 and 32 are input to the OR gate 33 (33-5 through 33-0), which outputs the data 1 (high signal), if one of the outputs of the AND gates 31 and 32 is 1. That is, the output of the 1 detecting circuit 24 or the 0 detecting circuit 25, which is selected according to a selection signal, is output as a result of the bit search circuit according to this preferred embodiment.

The operations of the bit search device having the above described configuration are explained below.

As described above, the 32-bit input data signal D is latched by the data latch 22 that is synchronized with a clock signal (CLK), while the detection-type signal K is latched by the signal latch 23 that is synchronized with the clock signal (CLK) output at the same timing. Specifically, the input data signal D and the detection-type signal K are latched when one clock signal (CLK) is output.

Figure 11:
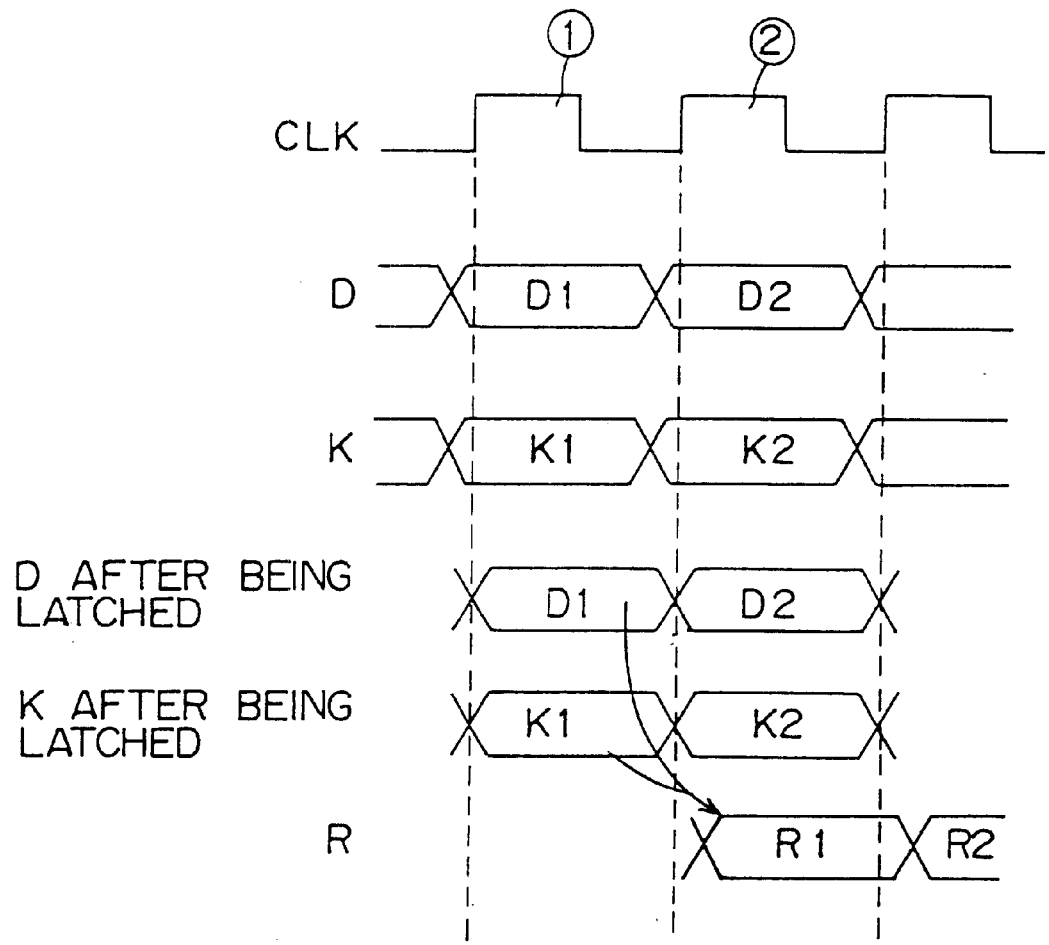
FIG. 11 is a timing chart showing the process implemented in the first preferred embodiment.

FIG. 11 is a timing chart showing the output timing of the cock signal (CLK) at this time. The latch process described above is performed at the output timing of the clock signal (CLK) shown as (1) in FIG. 11.

The 32-bit input data signal D, which is latched by the data latch 22 as described above, is input to the 1 detecting circuit 24 and the 0 detecting circuit 25. These circuits perform their respective processes. For example, the 32-bit data input to the 1 detecting circuit 24, which are shown in FIGS. 8 and 9, are input to the AND gates 27-30 through 27-0 and the OR gates 28-29 through 28-0, which are shown in FIG. 8. If the data of the most significant bit 31 is 1, 1 (high signal) is output from the A31.

At the same time, if the most significant bit 31 is 0 and if the second most significant bit 30 is 1, 1 (high signal) is output from the output (A30) of the AND gate 27-30. Furthermore, if the most significant bit 31, the second most significant bit 30, and the next bit 29 are all 0, 1 (high signal) is output from the output (A29) of the AND gate 27-29.

Thereafter and in a similar manner, 1 (high signal) is output from the output (A28) of the AND gate 27-28 if the bit 28 is 0, and 1 (high signal) is output from the output (A27) of the AND gate 27-27 if the bit 27 is 0. The information indicating the bit position at which the bit data becomes 1 is sequentially output from the AND gates 27-26 through 27-0 (A26 through A0).

The above described process is a process for detecting the bit position at which data becomes 1 as a result of a search made from the most significant bit toward the least significant bit within the data string of the input data signal D, and for outputting 1 (high signal) from any of the outputs A0 through A31, which corresponds to the bit position. Even if the value 1 appears at and after the bit where the data first becomes 1 as a result of the search made from the most significant bit toward the least significant bit, data 0 inverted via corresponding gates among the OR gates 28-0 through 28-29 are input to the AND gates 27-0 through 27-30. Accordingly, even if the data at and after the bit where its value becomes 1 appears consecutively, the data are not fed to the outputs (A30 through A0) as the original values (the data become 0 (low signal)).

Next, the above described outputs A31 through A0 are input to the corresponding OR gates 30-5 through 30-0 as shown in FIG. 9, so that a bit search result is output from the selector circuit 27. For example, if the most significant bit 31 is 1, only the output A31 becomes 1 and the 32-bit outputs (A31 through A0) become 1000 . . . 00 in the circuit shown in FIG. 8. Then, 000000 are output as the outputs (X5 through X0) of the NOR gate 30-5 and the OR gates 30-4 through 30-0.

Additionally, if the second most significant bit 30 is 1, only the output A30 of the circuit shown in FIG. 8 becomes 1, and the 32-bit outputs (A31 through A0) become 0100 . . . 00. Then, 000001 are output as the outputs (X5 through X0) of the NOR gate 30-5 and the OR gates 30-4 through 30-0, which are shown in FIG. 9.

Furthermore, if the next bit 29 is 1, only the output A29 of the circuit shown in FIG. 8 becomes 1, and the 32-bit outputs (A31 through A0) become 0010 . . . 00. Then, 000010 are output as the outputs (X5 through X0) of the NOR gate 30-5 and the OR gates 30-4 through 30-0, which are shown in FIG. 9.

Still further, if the data of the next bit 28 is 1, only the output A28 of the circuit shown in FIG. 8 becomes 1, and the 32-bit outputs (A31 through A0) become 00010 . . . 00. Then, 000011 are output as the outputs (X5 through X0) of the NOR gate 30-5 and the OR gates 30-4 through 30-0, which are shown in FIG. 9.

With the process performed in a similar manner, the output of the circuit shown in FIG. 9 (the output of the 1 detecting circuit 24) becomes 000100, 000101, and 000111. The output of the circuit shown in FIG. 9 (the output of the 1 detecting circuit 24) becomes 011111 if only the least significant bit is 1, and 100000 if all of the bits are 0.

Above result is given by using the 1 detecting circuit 24, therefor if the 0 detecting circuit 27 instead of the 1 detecting circuit 25 is used, reverse result is given such as 1 and 0 reversed.

The results obtained by the 1 detecting circuit 24 and the 0 detecting circuit 25 in this way are output to the selector circuit 27, which makes a selection according to the selection signal output from the decoder 26. The selected result is then output as a bit search result of this preferred embodiment.

Here, the selection signal generated by the circuit described above and shown in FIG. 7 is provided from the decoder circuit 26. When the outputs (X5 through X0) from the 1 detecting circuit 24 are selected as described above, 1 is output as a selection signal. The selection signal (high signal) is output to the AND gates 31-5 through 31-0 shown in FIG. 10, so that the outputs of the 1 detecting circuit 24 are selected. At the same time, when the outputs from the 0 detecting circuit 25 are selected, 0 is output as the selection signal, and the high signal is output to the AND gates 32-5 through 32-0 via an inverter 37, so that the outputs (X5' through X0') of the 0 detecting circuit 25 are selected.

The process described above is performed while the input data signal D is being latched by the data latch 22. For example, when the next set of data (D2) is provided, the result of the process is output from the selector circuit 27 as a search result. Since a search result R is output when the next clock signal (CLK shown as (2) in FIG. 11) is provided, the search result can be obtained with the outputs of the two clock signals (CLKs) in this preferred embodiment.

Figure 3:
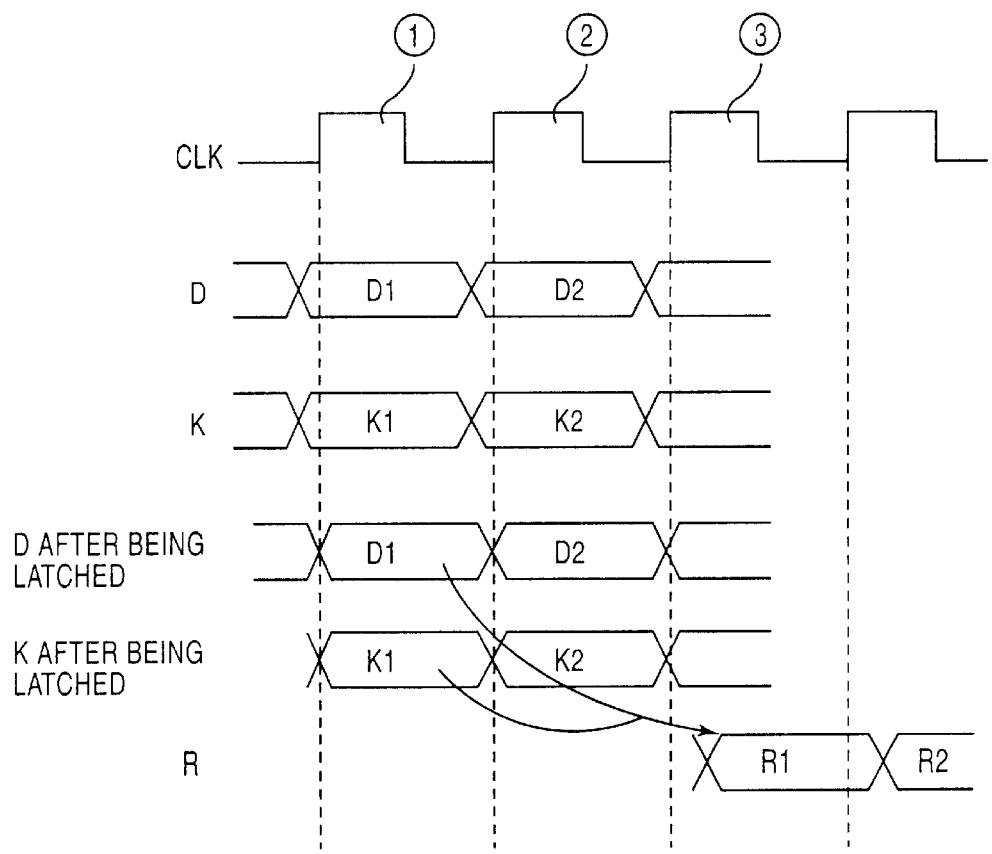
FIG. 3 is a timing chart showing a conventional bit search process.
Figures 4A, 4B:
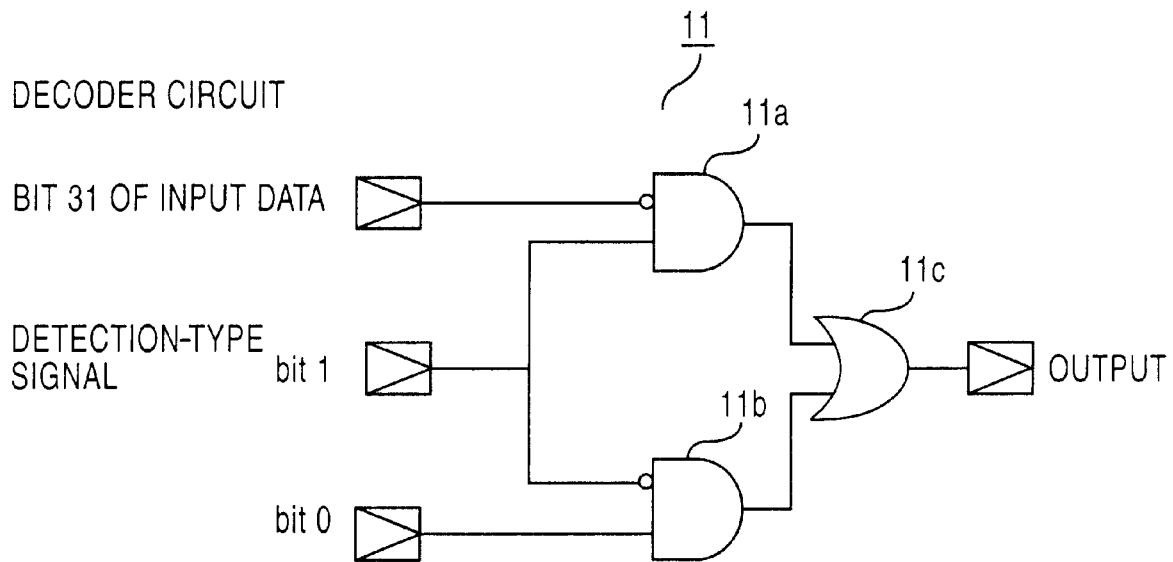
FIG. 4A is a circuit diagram showing a decoder circuit of the bit search circuit, which is used by the conventional technique.
FIG. 4B shows a truth table used by the conventional technique.

Comparing the output timing of a search result in this preferred embodiment with that of the conventional search result shown in FIG. 3, the number of times that a clock signal (CLK) is output is smaller in this preferred embodiment, which enables a bit search to be performed at high speed.

Second Preferred Embodiment

Below is an explanation about a second preferred embodiment according to the present invention.

FIG. 12 is a block diagram showing a bit search method according to the second preferred embodiment. Unlike the above described first preferred embodiment, a change point detecting unit is included instead of the 1 and 0 detecting units, and a change point at which data changes from 0 to 1 or from 1 to 0 is detected within the data string of an input data signal D.

That is, in FIG. 12, this preferred embodiment comprises a decoder 34, a change point detecting unit 35, and a selector 36. A detection result is obtained via the selector 36. The input data signal D is 32-bit data that is similar to the first preferred embodiment. This signal is provided to the change point detecting unit 35, and the data of the most significant bit 31 of this signal is input to the decoder 34. Additionally, a detection type signal K is 2-bit data and is output to the decoder 34.

The change point detecting unit 35 detects the bit position at which data changes from 0 to 1 or from 1 to 0 within the 32-bit data structure of the provided input data signal D, and outputs the detected bit position to the selector 36. The decoder 34 generates a selection signal according to the detection-type signal K and the data of the most significant bit 31, and outputs the generated signal to the selector 36.

The selector 36 outputs, as a detection result, the information about the bit position at which data changes, which is output from the change point detecting unit 35, according to the selection signal input from the decoder 34.

Figure 13:
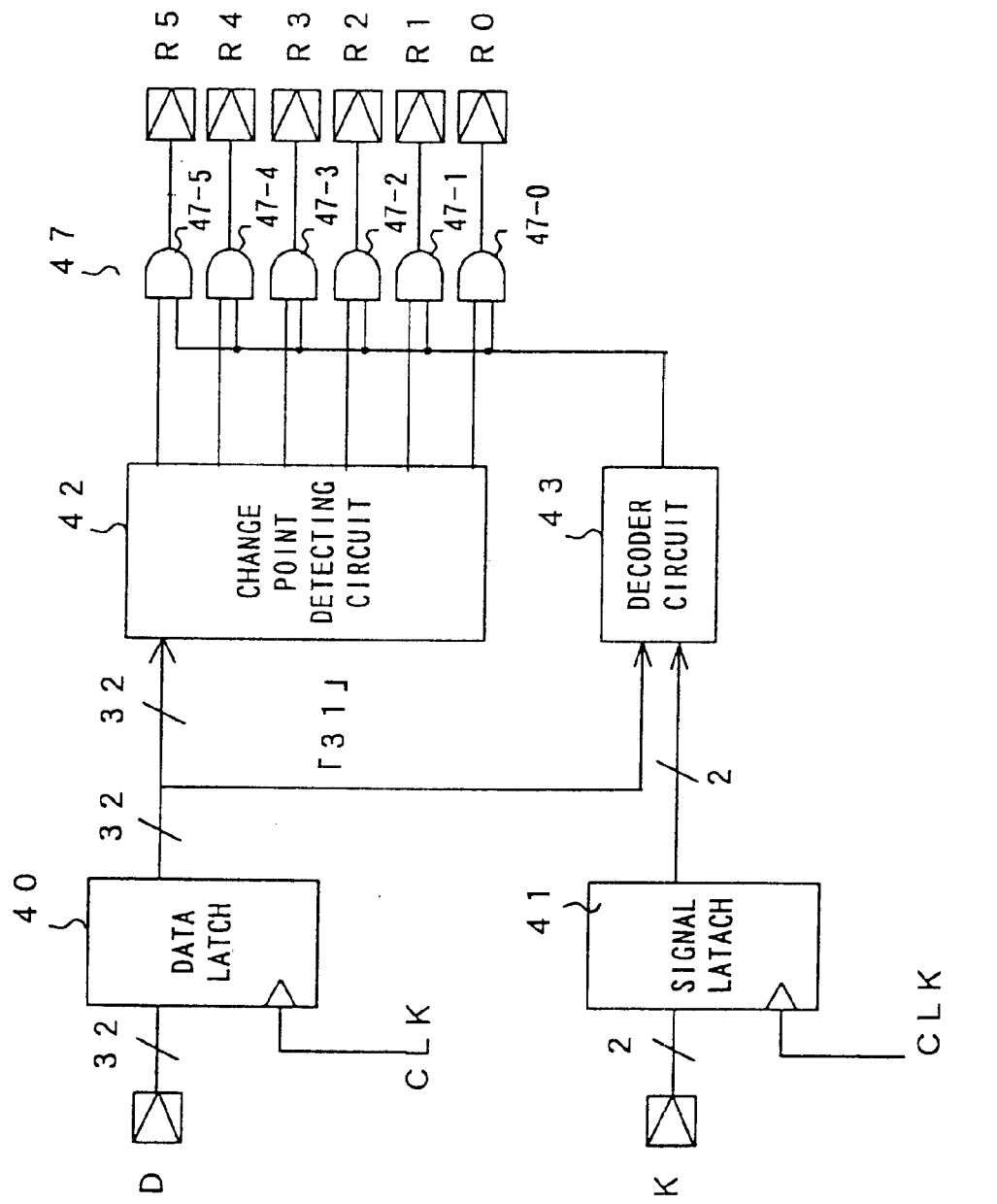
FIG. 13 is a circuit diagram showing a bit search circuit according to the second preferred embodiment.

A circuit diagram of a specific configuration of the above described bit search method is shown in FIG. 13. The bit search circuit according to this preferred embodiment is comprised of a data latch 40, a signal latch 41, a change point detecting circuit 42, a decoder circuit 43, and a selector circuit 47, which correspond to the components shown in FIG. 12.

Figure 14:
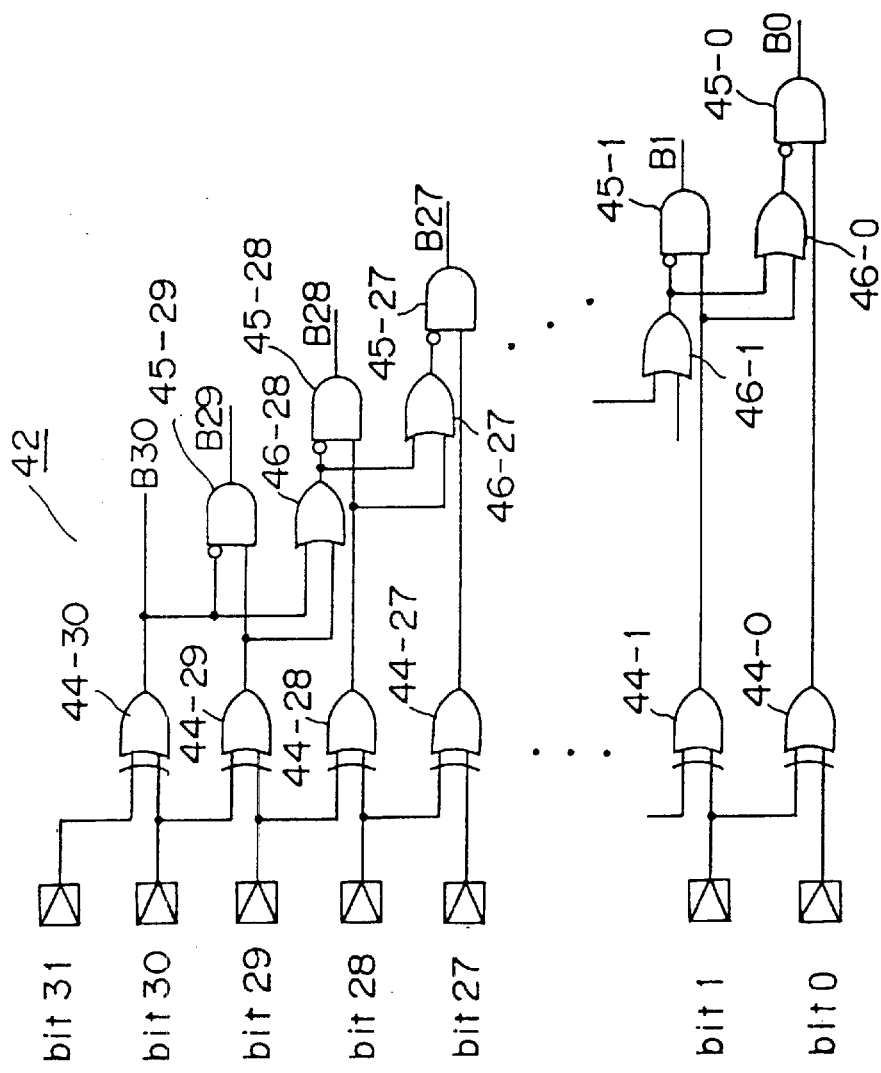
FIG. 14 is a circuit diagram showing a change point detecting circuit used for the bit search circuit according to the second preferred embodiment.

Here, FIG. 14 is a specific circuit diagram of the above described change point detecting circuit 42. The change point detecting circuit 42 is comprised of E-OR (Exclusive-OR) circuits 44-30 through 44-0, AND gates 45-29 through 45-0, and OR gates 46-28 through 46-0. Contiguous bit data are input to the E-OR circuits 44-30 through 44-0. By way of example, if the data of the most significant bit 31 and the second most significant bit 30 are provided to the E-OR circuit 44-30 and if these data do not match, 1 (high signal) is output from the E-OR circuit 44-30. Additionally, if the data of the subsequent bits 30 and 29 are input to the E-OR circuit 44-29 and if they do not match, 1 (high signal) is output from the E-OR circuit 44-29.

Similarly, if the data of contiguous bits do not match, 1 (high signal) is output from corresponding E-OR circuits 44-28 through 44-0. Accordingly, the E-OR circuits 44-30 through 44-0 detect the bit position at which data within the bit string of an input data signal D changes from 0 to 1 or from 1 to 0, and output the detected bit position to the AND gates 45-29 through 44-0 and the OR gates 46-28 through 46-0.

For example, the output signal of the E-OR circuit 44-30 is inverted and input to the AND gate 45-29, and at the same time, the output signal of the E-OR circuit 44-29 is input to the AND gate 45-29. The AND gate 45-29 performs an output operation according to both of the input signals. Furthermore, both the output signal of the E-OR circuit 44-28 and the inverted signal of the signal output from the OR gate 46-28 are input to the next AND gate 45-28, which then outputs a corresponding signal. Thereafter, the change point detecting circuit is driven in a similar manner, so that change point detection data are output from the AND gates 45-27 through 45-0 (change point detecting circuit 42) to the selector circuit 47.

Here, assume that the output of the above described AND gate 45-0 is B0, the output of the AND gate 45-1 is B1, the output of the AND gate 45-2 is B2, ..., the output of the AND gate 45-28 is B28, the output of the AND gate 45-29 is B29, and the output of the E-OR circuit 44-30 is B30. In this case, the respective outputs B0 through B30 are input to the OR gates 48-0 through 48-4 and the NOR gate 48-5 according to the correspondences shown in FIG. 15.

For example, outputs B30, B28, B26, B24, B22, ..., B2, and B0 are input to the OR gate 48-0. If one of the inputs is 1, 1 (high signal) is output from the OR gate 48-0. Here, the output of the OR gate 48-0 is defined to be an output Y0. The above described correspondences are the same as those shown in FIG. 9. That is, outputs B29, B28, B25, B24, ..., B1, and B0 are input to the OR gate 48-1, and 1 (high signal) is output from the OR gate 48-1 if at least one of the inputs is 1. Additionally, the output of the OR gate 48-1 is defined to be an output Y1.

Similarly, outputs B27 through B24, B19 through B16, B11 through B8, and B3 through B0 are input to the OR gate 48-2, outputs B23 through B16 and B7 through B0 are input to the OR gate 48-3, outputs B15 through B0 are input to the OR gate 48-4, and outputs B30 through B0 are input to the NOR gate 48-5. If at least one of the inputs to the respective circuits is 1, 1 (high signal) is output from a corresponding OR gate.

As shown in FIG. 13, the selector circuit 47 is comprised of six AND gates 47-5 through 47-0, and is intended to output the result output from the change point detecting circuit 42 according to the selection signal output from the decoder circuit 43 and as a bit search result.

Figure 16:
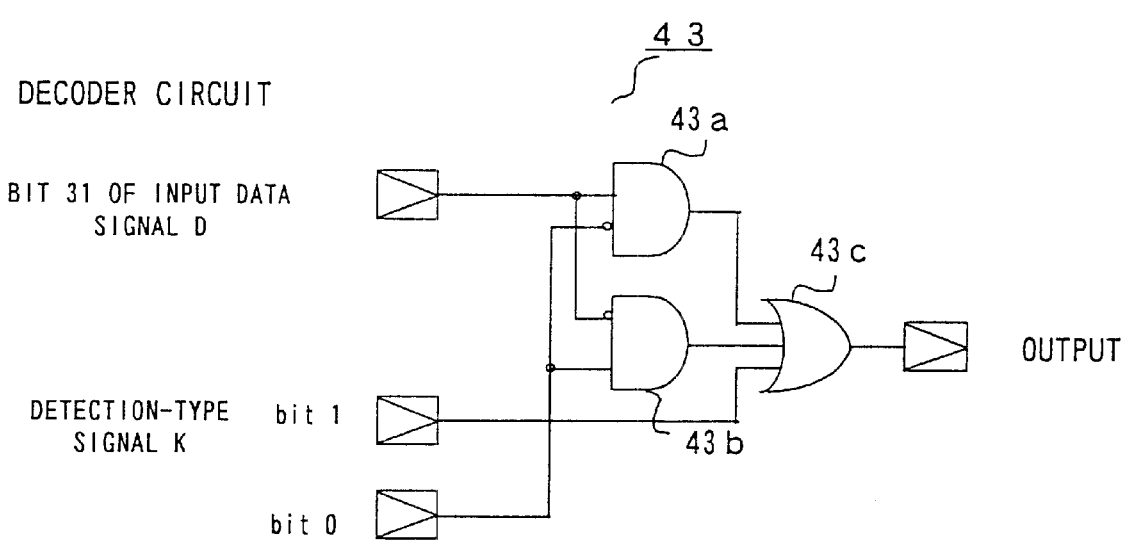
FIG. 16 is a circuit diagram showing a decoder circuit used for the bit search circuit according to the second preferred embodiment.

The decoder circuit 43 has a configuration as shown in FIG. 16, and is comprised of two AND gates 43a and 43b, and an OR gate 43c. In this preferred embodiment, the data of the most significant bit 31 of an input data signal D is input to the AND gate 43a, while the inverted data is input to the AND gate 43b. Additionally, one (bit 0) of the two bits of a detection type signal K is input to the AND gate 43b, while the inverted signal is input to the AND gate 43a.

AND gates 43a and 43b output 1 (high signal) or 0 (low signal) to the OR gate 43c according to input data. Also the other (bit 1) of the two bits of the detection-type signal K is input to the OR gate 43c. If at least one of the two inputs is 1, the OR gate 43c outputs 1 (high signal) to the selector circuit 47.

Provided below is an explanation about the process performed by the bit search device having the above described configuration according to the second preferred embodiment.

In a manner similar to the first preferred embodiment, an input 32-bit data signal D is first latched by the data latch 40 and is synchronized with a clock signal (CLK), and a detection-type signal K is latched by the signal latch 41 and is synchronized with the clock signal (CLK) output at the same timing. Accordingly, and also with the bit search method according to the second preferred embodiment, the input data signal D and the detection-type signal K are latched by the respective circuits with the output of one clock signal (CLK).

Figure 15:
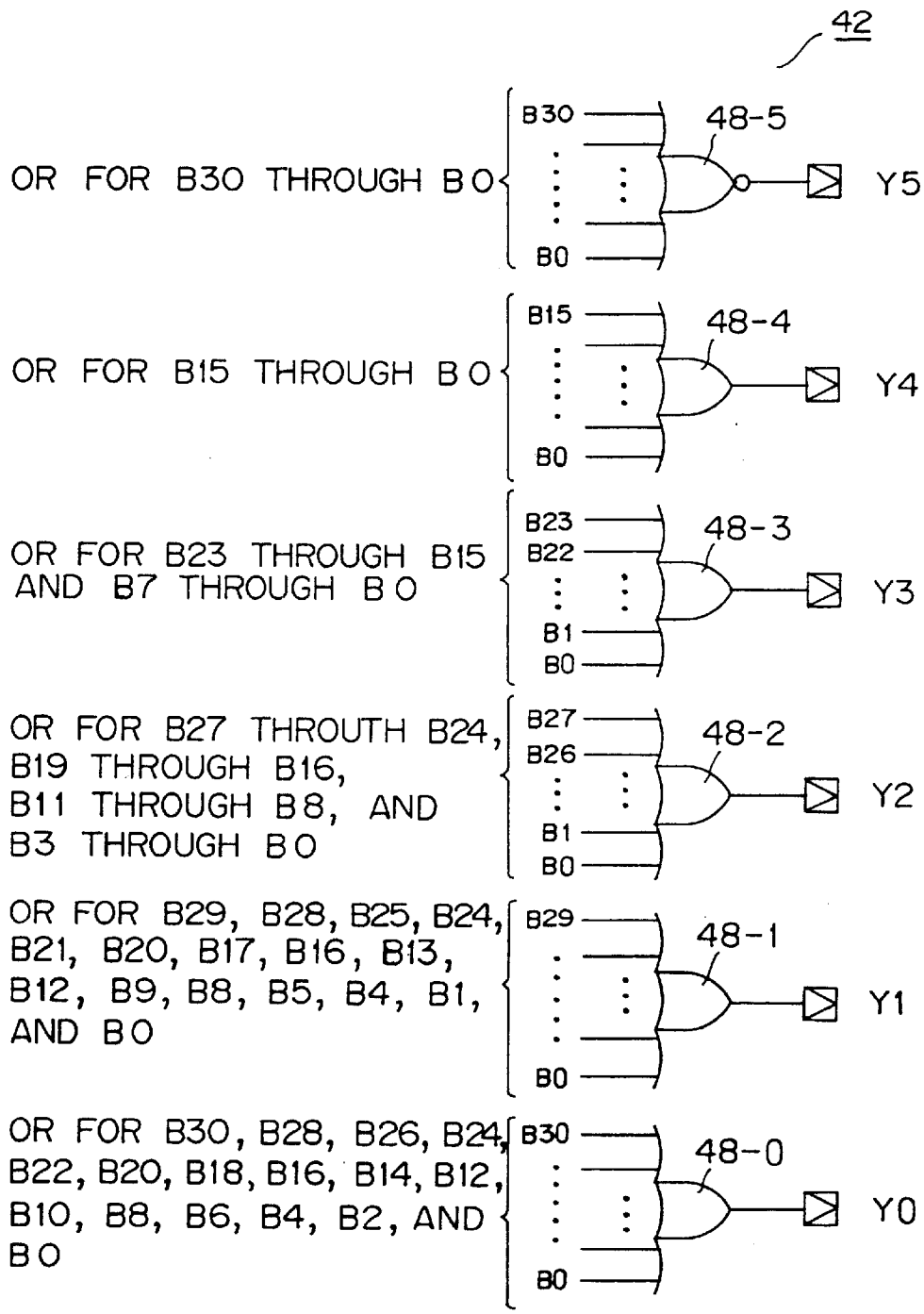
FIG. 15 is a circuit diagram showing the change point detecting circuit used for the bit search circuit according to the second preferred embodiment.

Next, the 32-bit data latched by the data latch 32 is input to the change point detecting circuit 42 according to this preferred embodiment, where the circuit processes shown in FIGS. 14 and 15 are performed. Specifically, the input data signal D is input to the E-OR circuits 44-30 through 44-0 shown in FIG. 14, and the bit position at which contiguous bit data are different is detected. That is, the bit position at which data changes from 0 to 1 or from 1 to 0 within the data string of the input data signal D is detected.

Here, assume that the most significant bit 31 is 0 and the second most significant bit is 1. Since both of the data are different in this case, 1 (high signal) is output (B30) from the E-OR circuit 44-30. In addition, if the bit 30 is 0 and if the next bit 29 is 1 (high signal), the output (B29) of the AND gate 45-29 also results in 1 (high signal). Note that 1 is output from a corresponding E-OR circuit not only when data changes from 0 to 1 but also when data changes from 1 to 0.

Thereafter, if contiguous data are different, 1 is output from a corresponding E-OR circuit 44-28 through 44-0, and moreover, 1 is output from a corresponding AND gate 45-29 through 45-0 in a similar manner. Accordingly, the above described outputs B30 through B0 are input to the OR gates 48-0 through 48-4 and the NOR gate 48-5, which are shown in FIG. 15, such that the following search outputs R5 through R0 result, and the output result of a bit change position (point) can be obtained.

Assuming that the most significant bit 31 of the input data signal D is 0 and the second most significant bit 30 is 1, the output B30 of the circuit shown in FIG. 14 is 1, and the outputs (B30 through B0) are 1000 ... 00, and the outputs (Y5 through Y0) of the NOR gate 48-5 and the OR gates 48-4 through 48-0, which are shown in FIG. 15, results in 000001.

Additionally, if the data of the bit 30 is 0 and if that of the next bit 29 is 1, the output B29 of the circuit shown in FIG. 14 is 1, and the outputs (B30 through B0) are 0100 ... 00. As a result, the outputs (Y5 through Y1) of the NOR gate 48-5 and the OR gates 48-4 through 48-0, which are shown in FIG. 15, results in 000010.

Furthermore, if the bit 29 is 0, and if the next bit 28 is 1, the output of the circuit A28 shown in FIG. 8 becomes 1 and the 32-bit outputs (A31 through A0) are 0010 ... 00. As a result, 000011 is output as the outputs (Y5 through Y0) of the NOR gate 30-5 and the OR gates 30-4 through 30-0, which are shown in FIG. 9.

Thereafter, with the process performed in a similar manner, the output of the circuit shown in FIG. 15 (the output of the change point detecting circuit 42) results in 000100, 000101, 000111 . . . . If the value of only the least significant bit is 1, the output of the circuit shown in FIG. 15 results in 011111, and in 100000 if all of the bits are 0.

The data from which the bit change position (point) is detected, as described above, is output to the selector circuit 47, and the bit search result of this preferred embodiment is output according to the selection signal output from the decoder circuit 43.

Here, the selection signal generated by the decoder circuit 43 having the configuration shown in FIG. 16 is provided therefrom. For example, if the selection signal is 1, the data output from the change point detecting circuit 42 is output without modification as a bit search result.

Also in this preferred embodiment, the above described search process is performed while the input data signal D is being latched. For example, when the next set of data is input, the result of the process is output as a search result from the selector circuit 27. Therefore, a high-speed bit search process can be realized according to this preferred embodiment.

Additionally, unlike the first preferred embodiment, the 1 detecting circuit 24 and the 0 detecting circuit 25 can be omitted by using the change point detecting circuit 42 in the second preferred embodiment, thereby also reducing circuit size.

The above described preferred embodiments are explained by assuming a configuration such that a bit search direction is in the direction from the most significant bit toward the least significant bit within an input data string. However, the bit search direction may also be in the direction from the least significant bit toward the most significant bit within an input data string. Furthermore, the bit search direction may be bidirectional.

Furthermore, the input data signal D is referred to as a 32-bit signal in the above described preferred embodiments. However, this signal is not limited to 32 bits. Also, the detection-type signal K is not limited to 2 bits, although it is referred to as a 2-bit signal in the above explanation.

Still further, the bit search method according to the present invention may be implemented by using the system shown in FIG. 17. As shown in this figure, a processing device (such as a computer) 50 performs the above described bit search process with a program (data) provided from an internal RAM device or a hard disk 51 thereof.

Still further, the above described process may be performed according not to the program (data) provided by the internal RAM device or hard disk 51, but according to the program (data) provided from an external storage medium 52 such as a magnetic disk, a magnetic tape, a floppy disk, an optical disk, etc., by exchanging the data with the storage medium 52.

Still further, the program (data) transmitted from a provider 53 via a communications line may be used as shown in FIG. 17.

As described in detail above, according to the present invention, a bit search process can be quickly performed and arithmetic operations, including decimal point operations, etc., can also be quickly performed.

Furthermore, a circuit scale can be reduced by adopting a configuration where a change point of an input data signal is detected, which leads to a device size reduction.

What is claimed is:

1. A bit search device, comprising:

selection signal generating circuit for generating a selection signal;

1 detecting circuit for detecting a bit position at which data changes from 0 to 1 within an input data string in the direction from one of the most significant bit to the least significant bit and the least significant bit to the most significant bit;

0 detecting circuit for detecting a bit position at which data changes from 1 to 0 within an input data string in the direction from one of the most significant bit to the least significant bit and the least significant bit to the most significant bit; and selecting circuit for selecting either of an output of said 1 detecting circuit and an output of said 0 detecting circuit according to the selection signal output from said selection signal generating circuit, and for using either of the outputs as a bit search output.

2. The bit search device according to claim 1, wherein said selection signal generating circuit generates the selection signal from a detection-type signal and data at a predetermined bit or predetermined bits of an input data string.

3. The bit search device according to claim 1 or 2, wherein said selection signal generating circuit, said 1 detecting circuit, said 0 detecting circuit, and said selecting circuit are configured by gate circuits.

4. The bit search device according to claim 1, wherein said 1 detecting circuit and said 0 detecting circuit detect the bit position in synchronization with driving of said selection.

5. A bit search method, comprising:

a selection signal generating step of generating a selection signal;

a 1 detecting step of detecting a bit position at which data changes from 0 to 1 within an input data string in the direction from one of the most significant bit to the least significant bit and the least significant bit to the most significant bit;

a 0 detecting step of detecting a bit position at which data changes from 1 to 0 within an input data string in the direction from one of the most significant bit to the least significant bit and the least significant bit to the most significant bit; and a selecting step of selecting either of results of said 1 detecting step or said 0 detecting step according to the selection signal generated by said selection signal generation step.

6. The bit search method according to claim 5, wherein said 1 detecting step and said 0 detecting step detect the bit position in synchronization with said selection signal generating step.

7. A computer-readable storage medium on which is recorded a program for causing a computer to execute a process, said process comprising:

a selection signal generating step of generating a selection signal;

a 1 detecting step of detecting a bit position at which data changes from 0 to 1 within an input data string in the direction from one of the most significant bit to the least significant bit and the least significant bit to the most significant bit;

a 0 detecting step of detecting a bit position at which data changes from 1 to 0 within an input data string in the direction from one of the most significant bit to the least significant bit and the least significant bit to the most significant bit; and a selecting step of selecting either of results obtained by said 1 detecting step and said 0 detecting step according to the selection signal generated by the selection signal generation step.

8. The computer-readable storage medium according to claim 7, wherein said 1 detecting step and said 0 detecting step detect the bit position in synchronization with a process performed by said selection signal generating step.

9. A bit search device, comprising:

selection signal generating means for generating a selection signal;

1 detecting means for detecting a bit position at which data changes from 0 to 1 within an input data string in the direction from one of the most significant bit to the least significant bit and the least significant bit to the most significant bit;

0 detecting means for detecting a bit position at which data changes from 1 to 0 within an input data string in the direction from one of the most significant bit to the least significant bit and the least significant bit to the most significant bit; and selecting means for selecting either of an output of said 1 detecting means and an output of said 0 detecting means according to the selection signal output from said selection signal generating means, and for using either of the outputs as a bit search output.

* * * * *